No. 782,811. PATENTED FEB. 21, 1905.
E. AMES.
EDUCATIONAL WEATHER VANE.
APPLICATION FILED JUNE 22, 1904.
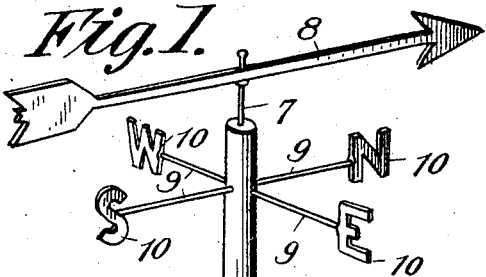
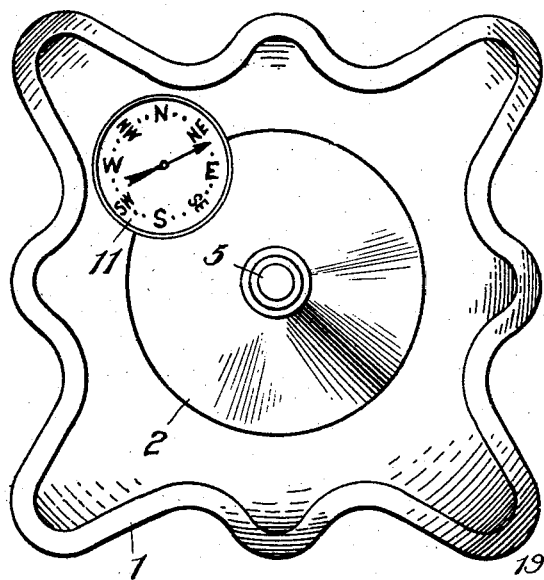
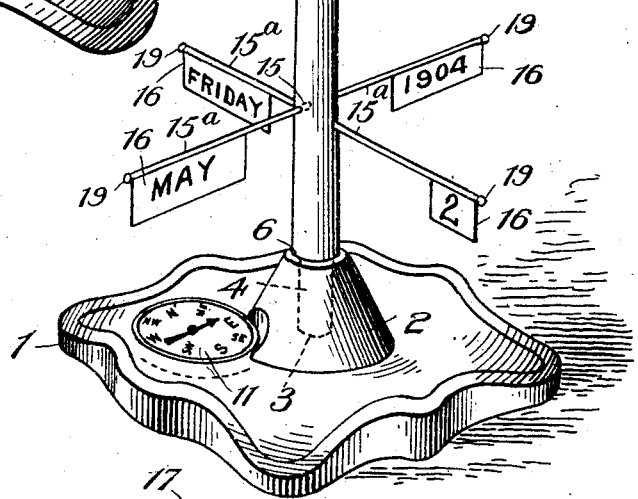
Witnesses:
J. D. Garfield
G. R. Driscoll
Inventor,
Elizabeth Ames,
by Wm. F. Bellows
Attorney.

No. 782,811.

Patented February 21, 1905.

UNITED STATES PATENT OFFICE.

ELIZABETH AMES, OF WILLIAMSBURG, MASSACHUSETTS.

EDUCATIONAL WEATHER-VANE.

SPECIFICATION forming part of Letters Patent No. 782,811, dated February 21, 1905.

Application filed June 22, 1904. Serial No. 213,741.

*To all whom it may concern:*

Be it known that I, ELIZABETH AMES, a citizen of the United States, residing at Williamsburg, in the county of Hampshire and State of Massachusetts, have invented a new and useful apparatus to be known as the "Educational Weather-Vane," of which the following is a specification.

My invention has relation, broadly, to new and useful improvements in educational appliances, and more particularly to a means or apparatus for teaching direction according to the points of the compass; for demonstrating and teaching the method of signaling weather conditions according to the system of signals employed by any of the standard systems, and especially that employed by the United States Weather Bureau, whereby typical conditions of weather may be recognized, and also to teach the names of the days of the week, months, days of the month, and years.

The objects of the invention are to provide an appliance of the character described which is extremely simple in construction and which will be capable of manipulation, so as to illustrate to eye and convey to the mind of the pupil the proper signals, designations of directions, &c., in the same relation and in the same manner as employed when in actual use, so that the pupil will be able to recognize the various signals and the intelligence they are intended to convey.

The invention consists, broadly and generally, in providing a suitable support upon which is mounted a miniature flagpole similar in construction to those generally used at weather-stations, carrying a suitable weather-vane and cardinal pointers and provided at suitable points with means for supporting weather-signaling devices and devices for holding cards or other signs designating the day of the week, month, day of the month, and year. A compass is also provided in order that the cardinal pointers may be properly arranged as to direction.

I have fully and clearly illustrated my invention in the accompanying drawings, to be taken as a part of this specification, and wherein—

Figure 1 is a perspective view of the complete appliance. Fig. 2 is an enlarged top plan view of the supporting-base and the flag or signaling pole supported thereon, the pole being stripped of indicating devices. Fig. 3 is a view of one of the arms or sticks carrying the signaling flags or cards, by means of which the latter are supported on the pole, and showing one of said flags or cards partially inserted in position on said stick.

Referring to the drawings, 1 designates a supporting base or plate of any suitable contour or design and constructed to rest upon a horizontal surface. This supporting-base is preferably constructed of some heavy solid material which when disposed on a flat surface will tend to prevent the overthrow of the appliance when in use. Centrally arranged on the upper face of this base is formed a vertical projection 2, having formed therein a step-socket 3, adapted to receive the lower reduced end 4 of the miniature flagpole 5, said pole being formed adjacent its reduced end with an annular shoulder 6, which rests upon the projection 2 when the reduced end of the pole is stepped in the socket. By thus supporting the flagpole on the supporting-base it will be perceived that the two elements are detachably united, whereby they may be separated for economy in space when packing for shipment or when not in use. The socket and the reduced end of the pole are preferably round in order to permit rotation of the pole in the socket, for a purpose to be presently described.

At the upper end of the flagpole is supported a vertical pivot-pin 7, upon which is mounted for free rotation a weather-vane 8, and beneath said vane, adjacent the end of the pole, are arranged and secured cardinal pointer-arms 9, bearing at their end portions the usual alphabetical designations 10 of the point of the compass toward which said arms are directed.

Upon the supporting-base 1 is arranged a magnetic compass 11, which is not only employed for purpose of teaching direction, but which also serves another useful purpose in connection with the flagpole.

It will be readily appreciated that in assembling the parts when the pole is first stepped in its socket that the cardinal pointers carried by the pole would not be likely to point accurately in the proper direction, and of course the usefulness of the device as to accuracy and success in teaching would be impaired; but by the use of the compass the base-plate may be placed with the indications on the compass-dial in proper position to correspond with the cardinal points and the pole then rotated so that the pointers 9 10, carried thereby, will correspond in direction with the indications on the dial. It will thus be seen that the pointers 9 and 10 may be readily arranged to point in the true direction.

The portion of the appliance as just described provides a very simple and efficient means for teaching direction according to the points of the compass and also the positions assumed by the weather-vane in indicating the direction of the wind. The device as just described may be used in demonstrating by either placing it where it will be subjected to the air-currents or may be blown by the breath or spun by the fingers until it reaches a position of rest, when the direction of the wind may be read by the pupil.

It will be known that by the present method of signaling weather conditions a number of flags of individual design, either separately or in combination, designate the probable condition of the weather and that these flags are displayed upon a pole by means of halyards. As contemplated by my invention the same method of signaling will be employed; but in order to afford simplicity and ease of manipulation, such as is necessary in such appliances, I provide a novel means for supporting the signaling-flags in position on the pole. At the present time either one or two flags are employed for signaling purposes, and when two are employed they are arranged in vertical alinement on the pole. Accordingly I form upon the pole in vertical alinement two sockets 12, (shown in dotted lines in Fig. 1,) each of which is adapted to receive the stick 13 of a signaling-flag 14, all as shown in Fig. 1. This flag signaling means enables the teacher to demonstrate to the pupils the proper flag to indicate any direction of the wind which may be indicated by the rotating weather-vane, and also the weather-vane may be moved to any position and the pupils then required not only to read the direction from which the wind comes, but also to indicate the same by proper flags. Signals designating climatic changes or directions of wind might also be placed in position and the pupils be required to shift the vane to correspond with the signal.

The signals as generally employed and their separate and combined indications are as follows: Red triangular flag, local storm, dangerous; black triangular flag, change of temperature; white flag, clear or fair; blue flag, rain or snow; blue-and-white flag, local rainfall; white flag with black square, cold wave; red flag with black square over white triangular flag, severe southwesterly winds; red flag with black square under white triangular flag, severe northwesterly winds; red flag with black square over red triangular flag, severe southeasterly winds; red flag with black square under red triangular flag, severe northeasterly winds.

As shown in Fig. 1 of the drawings, the red flag with black square is used over the red triangular flag, indicating severe southeasterly winds, and when such flags are displayed the pupil may be required to give the proper reading and in addition swing the vane to indicate the direction from which the wind blows.

For teaching names of the days of the week, months, days of the month, and years I place upon the flagpole 5 beneath the flags diametrically-located sockets 15, four in number and each of which is adapted to receive a stick 15ª, carrying a card 16, which bears indication of either the day of the week, month, day of the month, or year, and as there are four such arms employed it will be seen that each one of said sticks may carry one of said indications. This latter-mentioned device is used in connection with the other devices in order that the pupil may keep track of the days, months, &c., on the appliance and record thereon the day upon which certain climatic changes shown by the flags occur.

As a convenient means for uniting the flags and cards to their respective sticks I form each of said sticks with a groove 17, adapted to receive a bead or rib 18 on the card or flag. The groove 17 is made slightly longer than said bead in order that after the card is placed in the groove with its inner end abutting the inner terminal of the groove a portion of the stick, which is made of metal, will extend beyond the outer vertical edge of the card, which extended portion may then be headed or swaged over, as at 19, to close the outer end of the groove, and thereby prevent displacement of the card. In Fig. 3 of the drawings the card is shown partially inserted in the groove in the stick in order that the groove-and-bead arrangement will be clearly apparent.

What I claim is—

1. An educational device of the character described, comprising a base, a standard detachably mounted on said base, a rotatable vane on said standard, cardinal pointers also on the standard and a compass on the base.

2. An educational device of the character described, comprising a base having a socket, a standard formed at one end to be seated in said socket, a rotatable vane and cardinal pointers on the standard, and means for detachably receiving signaling devices on the standard.

3. An educational device of the character described, comprising a base, a standard rising therefrom, a rotatable vane on said standard, cardinal pointers also on the standard and a compass on the base.

4. An educational device of the character described, comprising a base, a standard rising therefrom, a rotatable vane and cardinal pointers on the standard and means for detachably securing signaling devices on the standard.

5. An educational device of the character described comprising a base, a standard rising therefrom and rotatably mounted thereon, a rotatable vane and cardinal pointers on the standard, and a compass carried by the base.

6. An educational device of the character described comprising a base, having a socket, a standard formed at one end to be seated in said socket, a rotatable vane, cardinal pointers on the standard, means for detachably securing signaling devices in the standard, and separate devices movably attached to the standard for indicating respectively days, months, days of the month, and year.

In testimony whereof I have signed my name to this specification in the presence of two subscribing witnesses.

ELIZABETH AMES.

Witnesses:
W. M. PENNINGTON,
R. M. O'BRIEN.